June 24, 1958 J. A. LIGNIAN 2,840,196
BRAKE SHOE
Filed Feb. 9, 1954
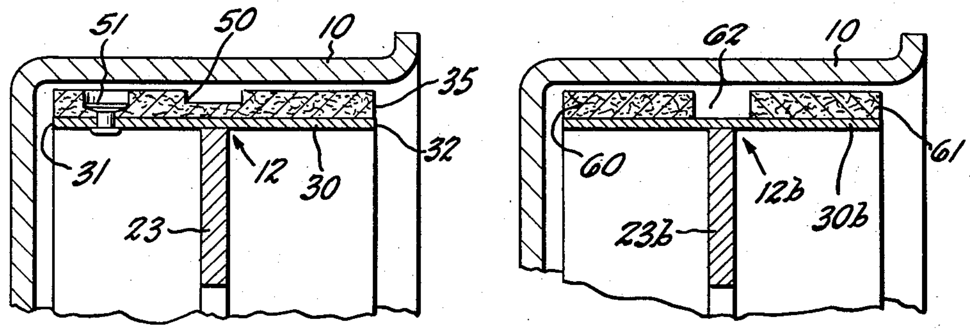
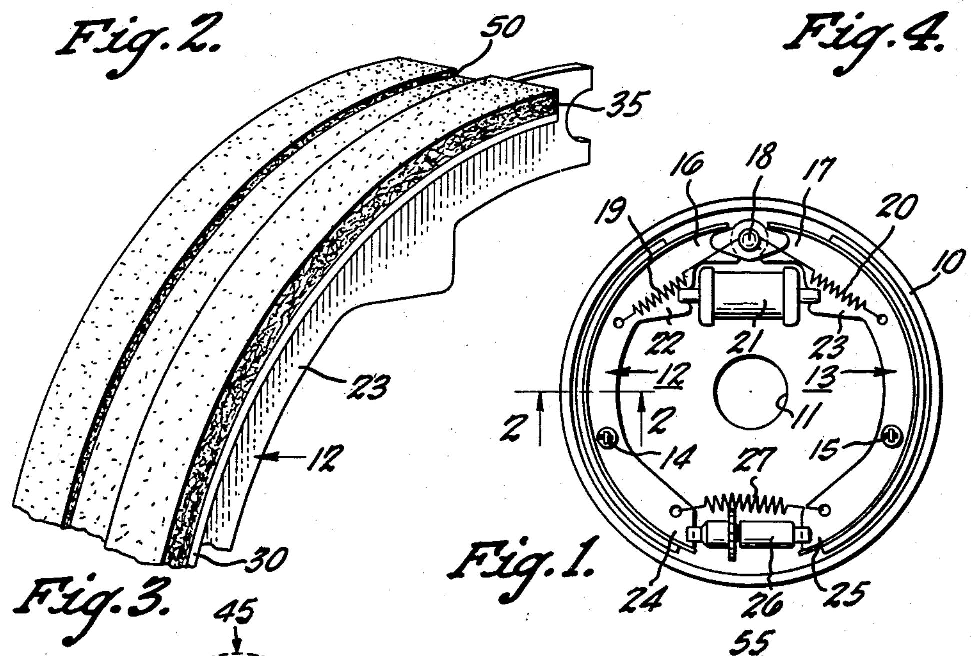
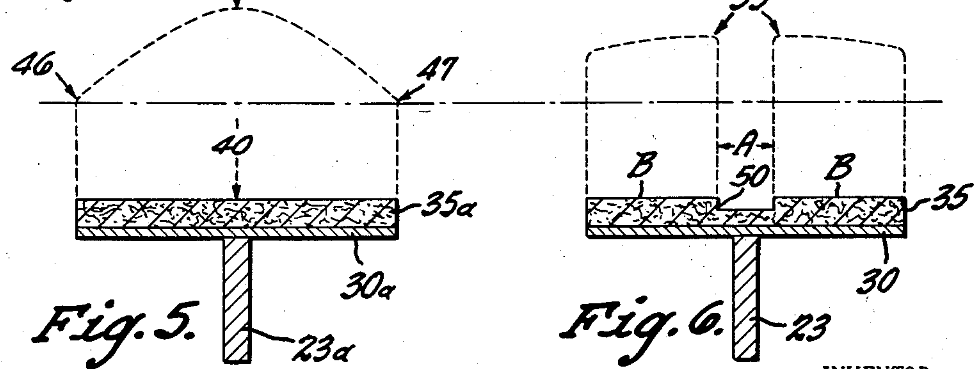
INVENTOR.
JEAN A. LIGNIAN
BY
Craig V. Morton
HIS ATTORNEY United States Patent Office 2,840,196

Patented June 24, 1958

2,840,196

BRAKE SHOE

Jean A. Lignian, Dayton, Ohio, assignor to General Motors Corporation, Detroit, Mich., a corporation of Delaware Application February 9, 1954, Serial No. 409,142

3 Claims. (Cl. 188—261)

This invention relates to a brake shoe for the brake of a motor vehicle and particularly to a brake shoe and brake lining combination wherein the brake shoe carries a friction lining formed of compounded materials bonded together.

It is the common practice in the manufacture of brake shoes for use in brakes in automotive vehicles to manufacture the brake shoe from metal parts and then bond or fasten a friction lining composed of various compounded materials onto the brake shoe. One of the major difficulties encountered in obtaining efficiently operating brakes is correct dissipation of heat from the lining. Where possible, every effort is made to avoid conditions that tend to create high temperature in the lining and the shoe. High temperature conditions shorten the life of brake linings and when temperature conditions are sufficiently high the linings are destroyed.

One of the difficulties that is evidenced by high temperatures in linings is that condition commonly referred to as "fading." This "fading" is no more than a loss of the coefficient of friction of the lining and occurs when brakes are placed under continuous heavy load conditions or rapidly repeated heavy loads. Thus when a vehicle operator applies the brakes of the vehicle repeatedly or continuously under heavy load conditions the end result is a rapid decrease of braking efficiency which reflects itself in the fact that the operator cannot stop the automobile.

It is therefore an object of this invention to provide an improved brake lining on a brake shoe wherein temperature conditions of the lining are not peaked so severely and thereby maintain a higher coefficient of friction for the lining to secure more uniform braking effort.

It is another object of the invention to provide an improved brake lining on a brake shoe wherein the brake lining has the friction surface thereof relieved or removed in the area of the shoe that creates abnormal or peak temperature conditions, which thereby maintains its braking efficiency over a greater period of braking effort.

In the manufacture of brake shoes that receive brake linings thereon it is the common practice to use a sheet steel material to form an arcuate shaped rim for the shoe and then attach to it a reinforcing web through which the braking pressure is applied to the rim and thereby to the lining as it engages the brake drum. These shoe structures are not absolutely rigid throughout the area of the shoe, but rather there is a condition of maximum rigidity created at the juncture between the web and the rim with the rigidity of the rim decreasing gradually from the web toward the outer edges of the rim. This results in a condition creating a degree of flexibility transversely remote from the web of the shoe that is greater than in that portion of the shoe immediately above and supported by the web.

It is therefore another object of this invention to provide a brake lining material on a brake shoe wherein the friction surfaces of the lining are spaced from one another transversely of the shoe in a manner to provide a space between the friction surface that is radially aligned with the web of the shoe so that there will be no friction surface in that area of the shoe immediately above the web in the area of maximum rigidity of the shoe, but rather the friction surfaces are on that area of the shoe of lesser rigidity, and which have a tendency to deflect relative to the web.

It is another object of the invention to provide an improved brake lining on a brake shoe which will provide for a more uniform loading of the lining across its entire friction surface and thereby effect a more uniform temperature condition throughout the body of the lining.

It is also an object of the invention to provide a brake lining for attachment to a brake shoe wherein the body of the lining has the friction surface thereof provided with a longitudinally extending groove that is adapted to be positioned radially outward of the web of a brake shoe thereby eliminating friction surface from the lining immediately in line with the line of pressure application from the web.

Further objects and advantages of the present invention will be apparent from the following description, reference being had to the accompanying drawings wherein a preferred form of the invention is clearly shown.

In the drawings:

Figure 1 is an elevational view of a brake structure in which the shoe of this invention is incorporated.

Figure 2 is a cross sectional view taken along line 2—2 of Figure 1.

Figure 3 is a perspective elevational view of a brake shoe and lining secured thereon.

Figure 4 is a cross sectional view similar to Fig. 2 but illustrating a slightly modified form of the invention.

Figure 5 is a schematic view illustrating diagrammatically the loading and temperature conditions of a conventional brake shoe and lining.

Figure 6 is a schematic view illustrating the temperature and loading conditions of a brake shoe and lining constructed in accordance with this invention.

In this invention the brake shoe and lining is applied to a conventional brake structure that includes a brake drum 10 and a backing plate 11. A pair of brake shoes 12 and 13 are slidingly supported upon the backing plate upon suitable land areas in conventional manner, the shoes being resiliently retained against the backing plate by the spring retainers 14 and 15 respectively.

The upper ends 16 and 17 of the shoes 12 and 13 engage an anchor pin 18. The shoes are retained in engagement with the anchor pin by the retraction springs 19 and 20. An actuating device 21 that comprises a hydraulic cylinder and operating pistons therein is positioned between the brake shoes 12 and 13 in engagement with the webs 22 and 23 respectively thereof whereby to expand the shoes into engagement with the brake drum 10. The opposite ends 24 and 25 of the brake shoes have an adjusting device 26 positioned therebetween of any conventional type, the tension spring 27 retaining the ends 24 and 25 of the brake shoes in engagement with the adjusting device 26.

The brake shoe 12, more particularly illustrated in Figures 2 and 3 comprises a sheet steel rim 30 that is arcuately shaped. This sheet steel rim is reinforced by the web 23 that is arcuately shaped and is disposed midway between opposite edges 31 and 32 of the rim 30 at a right angle thereto. The web 23 is also a sheet steel element that usually is welded to the rim 30 to provide an integral structure that is T-shaped in cross section.

The shoe 12 formed by the rim 30 and the web 23 is not an absolutely rigid structure but has a certain amount of flexibility transversely thereof relative to the web 23. The web 23 engaging the rim 30 longitudinally along the transverse center line effects maximum rigidity in the rim immediately above the web, that is radially relative to the rim. This longitudinally extending rigid portion of the rim 30 is therefore that portion that has the least, if any flexibility. However, transversely of the rim 30 relative to the web 23, as the rim 30 leaves the web 23 there is developed an increasing degree of flexibility or deformability between the web supported area and the edges 31 and 32 respectively. The outer edges 31 and 32 of the rim 30 has the maximum degree of flexibility or deformability.

In brake shoes of conventional design the rim 30 therefore performs somewhat as a catenary as it is cantilevered from the web 23.

Since the deformability of the rim 30 increases from the web 23 toward the outer edges 31 and 32 of the rim there is therefore a corresponding decrease in the brake loading applied to the friction surface of the lining 35 carried on the rim 30 in brake shoes of conventional design since the brake pressure applied to the rim through the web decreases because of the increasing flexibility of the rim transversely outwardly toward the edges of the rim.

In Figure 5 there is illustrated a brake shoe of conventional design that includes the rim 30*a* and the web 23*a* that corresponds with the same elements illustrated in Figures 1 and 2. A brake lining 35*a* of uniform cross section is placed on the surface of the rim 30*a*.

Under conditions heretofore described concerning the deformability or flexibility of the rim 30*a* as it becomes more remote to the web 23*a*, the maximum pressure loading on the lining 35 occurs radially outward of the web 23*a*, that is at the longitudinal center line of the lining 35 represented by the numeral 40. The maximum pressure loading of the lining 35*a* along the longitudinal center line 40 also results in a maximum temperature condition along this same line. The peak loading, both pressure-wise and temperature-wise is represented by the point 45 in the dotted line diagram of Figure 5 since both occur at the same point. From the peak loading there is a gradual decrease of pressure loading and therefore of temperature condition of the lining to the lowest loading condition, and therefore temperature condition, at the peripheral edges of the lining 35, as represented by the point 46 and 47 in the dotted line diagram.

This peak pressure loading condition, and temperature condition occurring immediately radially outward of the web 23*a* results in temperature conditions that may go as high as 1600° F. on the skin surface of the brake drum. Such temperature conditions char the brake lining with resultant destruction of the lining in this area. The charred or glazed lining loses its usefulness to the point where there is no favorable coefficient of friction left in the lining to effect any useful work.

Since the rim 30*a* of the brake shoe has increasing flexibility toward the peripheral edges thereof from the web 23*a*, the pressure loading of the area of the lining between the longitudinally extending mid-portion thereof and the peripheral edges is effectively reduced because the high point of pressure loading above the web together with the flexibility of the rim transversely thereof prevents a uniform distribution of pressure application to the lining on transversely opposite sides of the web.

All of these conditions reduce the ultimate life of the lining and reduce the total effectiveness of the efficiency of the lining for uniform load distribution is not provided over the entire friction surface of the lining. Also, the high peak temperatures created in the lining of conventional design of uniform cross section on a brake shoe results in higher lining temperatures which causes a more rapid "fading" of the brakes since the coefficient of friction of the lining goes down as the temperature rises, and can even approach zero effectiveness.

In this invention therefore, as illustrated in Figures 2 and 3, the lining 35 is provided with a groove 50 that extends longitudinally of the lining and is positioned immediately above the web 23, that is radially outward of the same. The groove 50 is sufficiently deep that it will always be present during the total life of the lining, that is, until the lining surface wears to the head of the rivets 51 that secure the lining 35 to the rim 30.

The groove 50 in the lining 35 is of a width to extend transversely beyond the peak temperature area of the lining. The width of the groove is dependent upon the degree of deformability of the rim 30, being narrower as the deformability of the rim 30 decreases. Generally speaking, it has been found that a groove 50 of about three times the width of the web 23 will perform satisfactorily in the average brake shoe in which the rim and the web are constructed of sheet steel about 3/32 of an inch in thickness.

In Figure 6 there is illustrated schematically a representative pressure and therefore resultant temperature diagram resulting from the use of a brake shoe with a lining constructed in accordance with this invention. The space "A" between the friction surfaces "B" of the lining 35 is of course an inactive area. The friction surfaces "B" engage the brake drum in an off-set relation relative to the web 23, these friction surfaces "B" being in the area of the rim 30 that are more deformable than that area of the rim 30 radially above the web 23. Thus the friction surfaces "B" conform more uniformly to the surface of the brake drum with the result of obtaining more even distribution of the brake loading across the entire area of the friction surfaces. Further, since the groove 50 in the lining 35 avoids peaking of pressure and temperature conditions in the area of the rim above the web 23, the maximum pressure and temperature condition created in the lining 35 is less than the maximum peak temperature created in the conventional brake lining 35*a* shown in Figure 5. This is represented in the line diagram of Figure 6 by the peaks 55 of the representative force-temperature diagram.

In actual experience it has been found that the temperature of the lining friction surface at the edges of the groove 50 must of necessity be lower than the peak temperature existing in the conventional lining 35*a* above the web 23*a* (see Figure 5) for the reason that no evidence of charring of the lining has been found under equivalent service conditions of a conventional brake shoe vs. brake shoes constructed in accordance with this invention.

Further, with the elimination of the peak temperature conditions normally found with the conventional brake shoe and lining structure hereinbefore described, it has been found that there is no metallurgical structural change in the brake drum iron in that area normally engaged by the high temperature lining of the conventional brake shoe. With conventional brake shoes, the peaking of the pressure and temperature conditions in the area above the web of the brake shoe has resulted in a change in the metallurgical structure of the iron of the drum to a Martinsitic structure. This embrittlement of the drum in the area above the web of the brake shoe results in a much weaker drum and one that is highly susceptible to cracking.

Further, again referring to Figure 6, the line diagram shown therein illustrates the increase in uniform distribution loading effected on the brake lining toward the peripheral edges thereof. The loading on the lining becomes more uniform throughout its entire surface area and actually becomes more effective since the entire surface area is being worked more uniformly.

In Figure 4 there is illustrated a slightly modified arrangement of brake shoe and lining structure wherein the brake shoe 12*b* comprises a rim 30*b* and a web 23*b* like that of the shoe illustrated in Fig. 2. In the structure of Figure 4 however the brake lining is composed of two parts 60 and 61 that are spaced one from the other to provide a space 62 therebetween that is positioned radially outward of the web 23*b*. Thus it is apparent that the result of this invention can be obtained either by the use of a grooved lining as illustrated in Figure 2 or by the use of spaced lining elements as illustrated in Figure 4.

While the form of embodiment of the invention as herein disclosed constitutes a preferred form, it is to be understood that other forms might be adopted as may come within the scope of the claims which follow.

What is claimed is as follows:

1. A brake shoe for a vehicle brake, comprising, a brake shoe rim, a rim reinforcing web engaging one side of the rim, and a continuous friction lining on the opposite side of the rim fully engaging the same and having friction surfaces spaced one from the other forming thereby a space between the friction surfaces, said space being positioned radially outwardly from the web and of a width at least twice the width of engagement between the web and the rim, said space opening in a direction radially outwardly with respect to said lining whereby the friction surface of said lining in the area above said web is completely eliminated.

2. A brake shoe for a vehicle brake, comprising, a brake shoe rim, a rim reinforcing web engaging one side of the rim effecting thereby greater rigidity of the rim in line with said reinforcing web than transversely thereof, and friction lining on the opposite side of the rim fully engaging the same and having longitudinally and transversely continuously extending friction surfaces offset transversely from both of opposite sides of said web with longitudinal parallel edges of said friction surfaces disposed in immediate adjacent spaced relationship one relative to the other on opposite sides of said web and just outside parallel radial planes extending from opposite sides of said web, said parallel edges defining a space having a width at least twice that of said web and opening in a direction radially outwardly with respect to said brake shoe rim whereby the friction surface of said lining in the areas above said web is completely eliminated.

3. A brake shoe for a vehicle brake, comprising, a brake shoe rim, a rim reinforcing web engaging one side of the rim effecting thereby greater rigidity of the rim in line with said reinforcing web than transversely thereof, and friction lining on the opposite side of the rim fully engaging the same and having friction surfaces offset thereon transversely relative to both sides of said web with the friction surfaces disposed wholly in the rim area of less rigidity and beyond opposite sides of the web, the inner adjacent edges of said offset friction surfaces defining a space having a width at least twice that of said reinforcing web and opening in a direction radially outwardly with respect to said rim whereby no friction surface is provided in the rim area of maximum rigidity radially outwardly of the web.

References Cited in the file of this patent

UNITED STATES PATENTS

| | | |
|---|---|---|
| 1,923,872 | Loughead | Aug. 22, 1933 |
| 2,144,016 | Gallup | Jan. 17, 1939 |
| 2,166,157 | Jones et al. | July 18, 1939 |
| 2,647,592 | Tolden | Aug. 4, 1953 |
| 2,661,819 | Strohm | Dec. 8, 1953 |

FOREIGN PATENTS

| | | |
|---|---|---|
| 807,511 | France | Oct. 19, 1936 |